Dec. 1, 1970          R. A. BELLE ISLE          3,544,675
FORMING SKINS ON PLASTIC CELLULAR MATERIAL
Filed Sept. 27, 1967
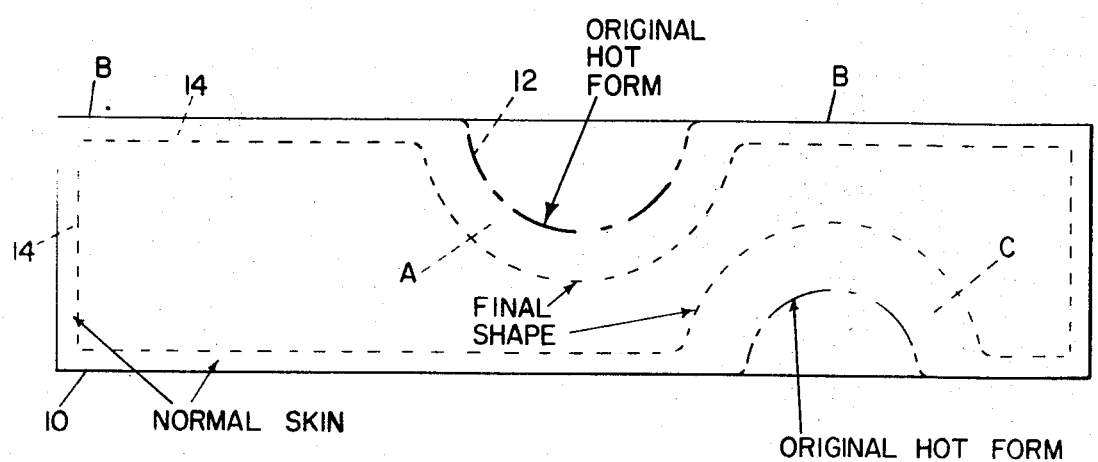
INVENTOR
RICHARD A. BELLE ISLE
BY *Charles R. Jay*,
ATTORNEY

United States Patent Office 3,544,675
Patented Dec. 1, 1970

3,544,675
FORMING SKINS ON PLASTIC CELLULAR MATERIAL
Richard A. Belle Isle, Wilbraham, Mass. (% Tainer Tech Corporation, Corner Sutton and Main Sts., Northbridge, Mass. 01534)
Filed Sept. 27, 1967, Ser. No. 670,965
Int. Cl. B29d 7/22
U.S. Cl. 264—321         2 Claims

ABSTRACT OF THE DISCLOSURE

A method of forming a hardened skin surface on a plastic cellular light-weight material particularly adapted for custom packaging, etc., the method comprising heating and forming the plastic material and then reducing the thickness thereof in the heated areas by applying a cold forming die thereto while the material is still hot, and including forming the material under pressure and heat to the general shape desired but oversized in predetermined areas thereof, wherein the cold forming step reduces the oversized areas down to the final area or thickness desired while at the same time forming the hardened skin referred to.

---

This invention relates to forming skins or foamy cellular, plastic material. An example of this material is polyethylene foam which is light, cellular, and spongy. A linear polyethylene skin is formed on the surfaces of this materal, substantially sealing the pores.

In many cases it is desirable to provide a thicker, more rugged skin on such cellular foamy material e.g. polyethylene foam, particularly when it is used for packaging objects apt to cut the skin and damage the foam, and to this end this invention provides a process for forming such rugged skin of linear polyethylene, especially at selected areas of projected wear or damage.

Other objects and advantages of the invention will appear hereinafter.

In the drawing the figure is a diagrammatic view of a block of foam material having the new skin applied thereto and showing areas of thickness variation of skin.

In carrying out the present method, an illustration thereof resides in the provision of e.g. a polyethylene plank or block-like member 10 which is provided larger than the overall dimensions of the finished block which is desired to be made. The member 10 is oversize for the reason that it becomes reduced in dimension in the process of forming the skin on the finished article.

In the illustration, the original block is operated upon in a die apparatus under heat and pressure to form the general shape which is desired as shown in broken lines 12, but this is still oversize because the skin forming operation requires the utilization of a certain thickness of the foam material at the surface areas of the polyethylene block to form the skin. Thus although the broken lines show the desired shape it is still slightly oversize all around, although considerably reduced along the lines 12, which have applied thereto the legend "Original Hot Form."

While the block, as thus shaped under heat and pressure, it still hot say for instance from about three hundred degrees to four hundred degrees Fahrenheit, it is put in a cold die which forms it to the final shape. In this process a skin 14 of about e.g. a ten thousandths inch thick is formed on all sides of the block by the cold die using about three-sixteenths inch of foam. That is, if a skin of an order of ten thousandths of an inch is desired, the block 10 must be oversized about three-sixteenths of an inch all around. When this is done, the skin will be uniform in thickness and strength throughout.

However, if it is desired for a thicker and more rugged protective skin to be provided for instance in the area shown at A, an excess of more than three-sixteenths of an inch of foam is provided. For instance, if it is desired to have a more rugged skin in the nature of twenty thousandths of an inch, the area of 12 would have originally an excess in thickness of six-sixteenths of an inch, but the cold die would nevertheless form the article to the dimension and shape desired simply using more of the foam material to form the thicker skin. This can can be done at any area. In the case of area A, this is for the reception of an element which is to be packaged for instance; whereas the area surfaces at B will merely be mating areas of a complementary package-forming block or the like. The area C shows a still thicker resultant skin area because the original oversize was greater than at area A.

It will be seen that this method clearly and easily provides a foam block having a closed or continuous skin throughout and at selected areas a more rugged skin, all of which however is formed in the same step of the operation, it only being necessary to form the general shape, but oversized, under conditions of heat and pressure, and then to immediately transfer the heated oversized member to the cold die where it is brought to the exact dimension desired and with the skin reduced to various thicknesses, depending on the degree of original oversize after hot forming.

Having thus described my invention and the advantages thereof, I do not wish to be limited to the details herein disclosed, otherwise than as set forth in the claims, but what I claim is:

1. The method of forming a relatively hard skin on a shaped article of expanded plastic cellular material which comprises the steps of
   (a) heating the material;
   (b) shaping the heated material by the application of a shaped die thereto;
   (c) reducing the thickness of the heated and now shaped article at the shaped surface thereof by pressing a cold shaped die of conformation similar to the shape of the article, while the article is still in heated condition.

2. The method of claim 1 including the step of providing different degrees of oversize at selected areas and reducing the oversize down to the desired dimension by the cold forming step, thereby utilizing more of the foam material to form a thicker skin at certain predetermined areas than the thickness of the skin in other areas.

References Cited
UNITED STATES PATENTS

| | | | |
|---|---|---|---|
| 2,767,436 | 10/1956 | Noland et al. | 18—55 |
| 3,099,516 | 6/1963 | Henrickson | 18—48 |
| 3,207,646 | 12/1965 | Hacklandre | 156—281 |

JULIUS FROME, Primary Examiner

P. A. LEIPOLD, Assistant Examiner

U.S. Cl. X.R.
264—48